United States Patent [19]

Thome et al.

[11] Patent Number: 5,413,985
[45] Date of Patent: May 9, 1995

[54] PARTIALLY CRYSTALLINE, TRANSITIONAL ALUMINUM OXIDES, METHODS FOR THEIR SYNTHESIS AND USE FOR OBTAINING MOLDED ARTICLES, WHICH CONSIST ESSENTIALLY OF GAMMA $AL_2O_3$

[75] Inventors: Roland Thome, Bonn; Hubertus Schmidt, Eitorf; Reinhard Feige, Bonn; Ulrich Bollmann, Halle; Rudiger Lange, Lelha; Seigfried Engels, Halle-Neustadt, all of Germany

[73] Assignees: Vereinigte Aluminium-Werke A.G., Bonn; Leuna-Werke AG, Leuna, both of Germany

[21] Appl. No.: 997,736

[22] Filed: Dec. 30, 1992

Related U.S. Application Data

[62] Division of Ser. No. 894,330, Jun. 4, 1992, abandoned.

[30] Foreign Application Priority Data

Jun. 6, 1991 [DE] Germany .................. 41 18 564.1

[51] Int. Cl.⁶ .................... B01J 21/04; B01J 37/00
[52] U.S. Cl. .................... 502/355; 502/439; 423/625
[58] Field of Search .................. 502/355, 414, 439; 423/625

[56] References Cited

U.S. PATENT DOCUMENTS

| | | | |
|---|---|---|---|
| 2,746,842 | 5/1956 | Bloch et al. | 502/355 |
| 3,945,945 | 3/1976 | Kiovsky et al. | 502/355 |
| 4,075,125 | 2/1978 | Morimoto et al. | 502/355 |
| 4,579,839 | 4/1986 | Pearson | 502/439 |

*Primary Examiner*—Carl F. Dees
*Attorney, Agent, or Firm*—Darby & Darby

[57] ABSTRACT

The invention relates to a partially crystalline, transitional aluminum oxide containing 4-fold and 5-fold co-ordinated aluminum oxide in a ratio of at least 1:2. The invention also relates to a method of making this composition. The composition is particularly useful as starting material for manufacturing highly reactive molded articles. Accordingly, the invention also relates to this manufacturing process.

17 Claims, 4 Drawing Sheets

PARTIALLY CRYSTALLINE, TRANSITIONAL ALUMINUM OXIDES, METHODS FOR THEIR SYNTHESIS AND USE FOR OBTAINING MOLDED ARTICLES, WHICH CONSIST ESSENTIALLY OF GAMMA AL$_2$O$_3$

This is a division of Ser. No. 07/894,330 filed Jun. 4, 1992, and now abandoned.

FIELD OF THE INVENTION

The present invention relates to partially crystalline transitional aluminum oxides, their synthesis by shock calcination of hydrargillite, as well as their use in obtaining molded articles.

BACKGROUND OF THE INVENTION

Numerous methods, which find application in different fields, of synthesizing partially crystalline Al$_2$O$_3$ solid particles are known.

For example, it is known from Weinland and Stark: Chem. Ber. 59(1926), page 478, as well as from Petzold and Ulbricht: Argillaceous Earth and Argillaceous Earth Materials, Deutscher Verlag fuer Grundstoffindustrie, Leipzig, 1983, page 24, that partially crystalline and/or XRD amorphous aluminum oxides, with exceptionally large specific surface areas and high reactivities, can be obtained by the lengthy calcination of organic aluminum compounds or aluminum salts of different composition at atmospheric pressure and temperatures of more than 350° C.

Because of the low availability of the starting materials and of high synthesis costs, such synthesis methods are of little applicability for the industrial-scale production of gamma Al$_2$O$_3$ molded articles. Moreover, the products of the lengthy calcination of aluminum salts still contain foreign ions such as chloride, nitrate or sulfate in the oxidic solid material, which can have a very disadvantageous effect on the activity, selectivity and, accordingly, on their service life as a whole, when, for example, the product aluminum oxides are used in catalyst components.

Also, different methods have also been described for the shock-like dewatering of hydroxidic starting materials, particularly of α-Al(OH)$_3$. These methods also lead to transitional Al$_2$O$_3$ forms of low crystallinity, high solid state reactivity and large specific surface area. See, for example, BRD patents U.S. Pat. No. 2,059,946 and 2,826,095 and GDR patent 250,521.

However, the decomposition products obtained with the known methods contain crystalline portions of undecomposed aluminum trihydroxides, particularly hydrargillite (also known as gibbsite) and/or portions of hydrothermally formed boehmite. As a result, the required solid state reactivity is not always attained. (See Table 2, below: solubility in NaOH and reactivity in rehydration to boehmite.)

Accordingly, in the rehydration process, there is only a small degree of conversion of the Al$_2$O$_3$ particles into boehmite of fibrillar morphology, which is, however, of decisive importance for further processing, particularly for the peptization and molding of boehmitic aluminum hydroxides. Depending on the conditions of the individual technological steps of the synthesis process, Al$_2$O$_3$ molded articles synthesized by known methods (based on the shock calcination of aluminum trihydroxide particles, particularly of hydrargillite), consist of Al$_2$O$_3$ mixtures and, therefore, have an insufficiently developed pore structure and insufficient mechanical strength, particularly when used as catalyst components. It is also well known that, by intensive mechanical treatment of the solid particles before and/or after the shock calcination of the Al(OH)$_3$ particles, partially crystalline, transitional aluminum oxides or their mixtures (for example, German Offenlegungsschriften 1,028,106 and 3,128,833, GDR patent 274,980, Japanese patents 80/121 914 and 82/147 437) can be obtained with high proportions of XRD amorphous solids. These oxides contain no crystalline hydroxidic portions of undecomposed hydrargillite and/or hydrothermally formed boehmite. Depending on the residence time and the temperature of the suspension, the partially crystalline, transitional aluminum oxides may be rehydrated by known methods at atmospheric pressure (as described in German Offenlegungsschriften 2,826,095 and 2,726,126 and in Japanese patent 78/144 900), as well as under hydrothermal conditions (as described in European patent publications 0 055 164 and 0 073 703 and Japanese patent 78/144 900). Boehmite-rich aluminum hydroxides some of which contain appreciable amounts of bayerite, are thereby obtained.

From a technological point of view, these prior methods require expensive equipment. For example, expensive equipment is needed when shock calcination of the hydrargillite particles is combined with a mechanical pre-treatment and/or post-treatment of the solid particles. In addition, when hydrothermal rehydration conditions are used, portions of well crystallized solid particles of a boehmitic nature are formed. These well crystallized particles are disadvantageous to further processing, particularly to peptization with inorganic or organic acids, and which are disadventageous to the goal of obtaining highly porous, solid, molded Al$_2$O$_3$ articles.

German Auslegeschrift 1,200,271, German Offenlegungsschriften 2,633,599 and 3,128,833 and the Japanese patents 80/25 131 and 80/85 458 disclose a technology for producing molded Al$_2$O$_3$ articles on the basis of non-ground, i.e., non-mechanically pre-activated, shock calcined aluminum trihydroxides, particularly hydrargillite. This technology is characterized by molding partially mechanically post-treated crystalline or XRD amorphous solid particles (Japanese patent 78/144 900), which molding takes place before the rehydration. As a result of the hydrothermal procedure used, this method is disadvantageous for the desired development of pores in the micropore region, particularly on the proportion of pores with a radius of $r_p < 10$ nm.

OBJECTS OF THE INVENTION

It is, therefore, an object of the invention to provide a method for the synthesis of partially crystalline, transitional aluminum oxides having uniform phase composition and high solid state reactivity. During subsequent rehydration processes, the products of this method permit a high degree of conversion of the solid particles into a fibrillar boehmite at atmospheric pressure. Another object is to ensure advantageous further processing to molded articles which contain gamma Al$_2$O$_3$ having a well-developed internal surface area and high mechanical strength.

The molded Al$_2$O$_3$ articles prepared in this way are suitable particularly for the production of adsorbents, gas purifying compositions, catalyst components and catalyst supports, as well as for the manufacture of ceramic materials, polishing agents and abrasive grit.

SUMMARY OF THE INVENTION

It is the aim of the invention to provide a partially crystalline, transitional aluminum oxide composition having uniform phase composition and high solid state reactivity and a method of synthesizing this aluminum oxide composition. These are produced by way of rapid heat treatment of hydrargillite particles, preferably with pseudohexagonal platelet, pseudohexagonal needle or polyhedral shape, using suitable shock calcination conditions. The shock calcination is generally conducted at temperatures between about 350° C. and 750° C. for periods of time ranging from about 0.01 to 10 seconds. The synthesis method avoids the need for any prior activation by grinding. The transitional aluminum oxide composition has a content of 5-fold coordinated aluminum of at least 50% of the content of 4-fold coordinated aluminum. The composition has unexpected solubility and rehydration properties which are advantageous for further processing of the composition to make molded articles composed essentially of gamma-alumina.

Accordingly, the invention further provides a method of making such molded articles.

DETAILED DESCRIPTION OF THE INVENTION

These and other objects are accomplished pursuant to the invention by which highly reactive solid state particles are produced from partially crystalline, transitional aluminum oxides through the use of hydrargillite particles with certain solid state properties, particularly with regard to particle shape and size, as well as through a suitable selection of shock calcination conditions, without any prior activation by grinding. According to the present invention, it has been discovered that compared to the previously described transitional aluminum oxides (compare FIG. 6), these transitional aluminum oxides, with a content of 5-fold coordinated (trigonal-bipyramidal and/or quadratic-pyramidal) aluminum of at least 50% of the content of 4-fold coordinated (tetrahedral) aluminum, have special properties with respect to the primary and secondary structures, as well as the solid state reactivity.

Figure 5:
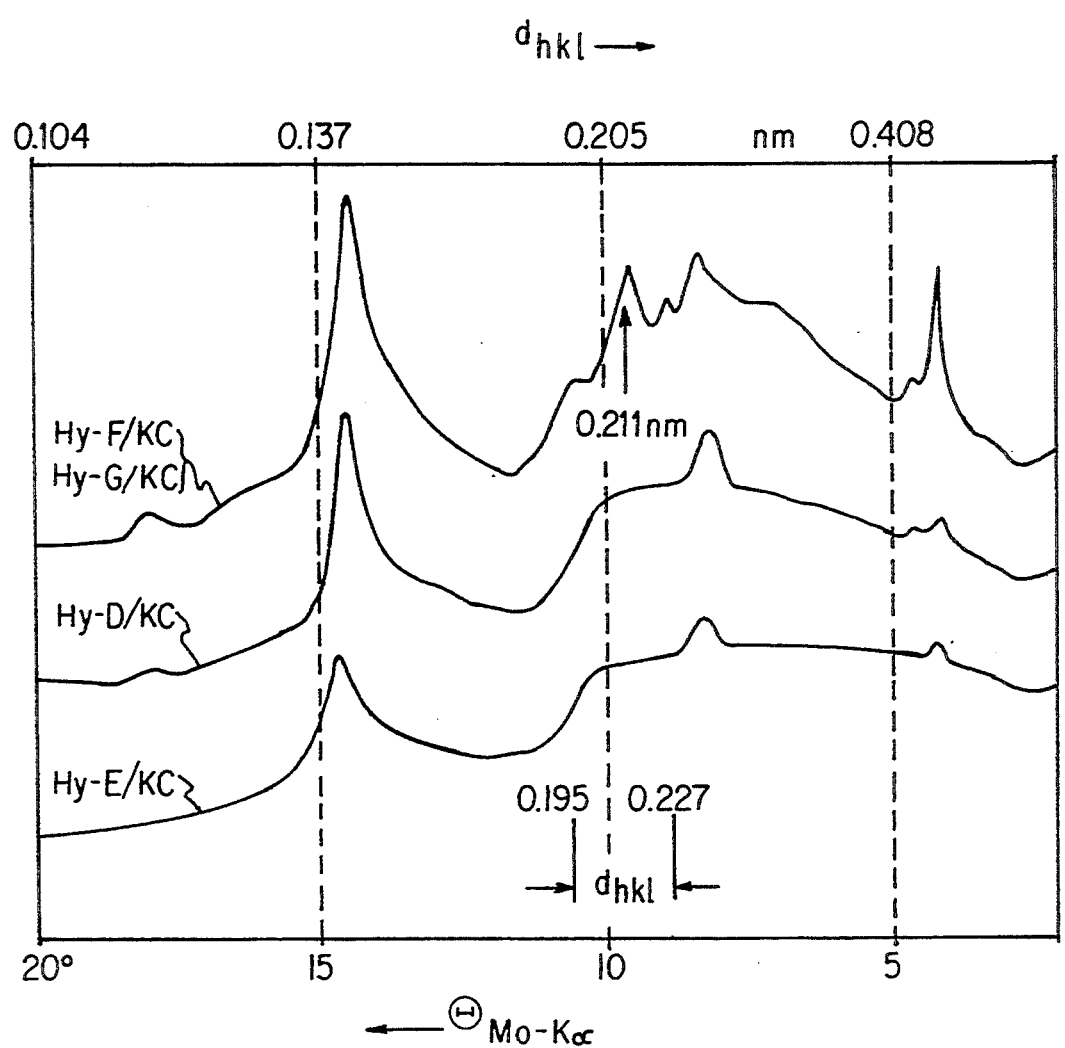
FIG. 5 shows an X-ray diffraction diagram of the shock calcination products. (Examples of the invention: "Hy-D/KC and Hy-E/KC, Hy-A/KC, Hy-B/KC and Hy-C/KC having similar X-ray diffraction diagrams. Comparison examples: Hy-F/KC and Hy-G/KC).

The transitional aluminum oxides according to the invention can be identified by a missing diffraction reflection (see FIG. 5). Preferably, the partially crystalline, transitional aluminum oxide of claim 1, wherein the composition has an x-ray diffraction pattern (the diffraction measured by means of Mo-K$_\alpha$ radiation in the glancing angle region of between 3° and 20°) showing no diffractions in the region corresponding to interplanar spacings ($d_{hkl}$) between 0.195 and 0.227 nm.

Surprisingly, it has now been observed that the inventive, transitional aluminum oxides have high solubility (L), for example, under the following conditions: the partially crystalline transitional aluminum oxide, dissolved in a 5N NaOH solution at a temperature of 60° C. for about 30 minutes. Preferably, at least about 90% by weight of the transitional aluminum oxides dissolve under these conditions.

The hydrargillite particles used as starting material can have a very different morphological structure.

The rehydration reactivity achievable under the following conditions leads to a particularly high proportion of boehmite of at least 70% by weight. This is a decisive prerequisite for the further processing of the transitional aluminum oxide obtained as intermediate. Partially crystalline transitional aluminum oxide is heated in water at 50° to 95° C. and at a pH of 5.5 to 10.5. Rehydration occurs within a period of 80 minutes to fibrillar boehmite, the proportion of which represents a measure of the rehydration reactivity and constitutes at least 70% by weight.

Surprisingly, it has also been observed that the solubility (L) of the intermediate, partially crystalline transitional aluminum oxide, depends only to a very slight degree on its specific surface area. This means that, under various conditions described below, intermediates with different surface areas are obtained, which nevertheless show a uniform rehydration behavior.

The present method for the production of molded articles, including essentially gamma Al$_2$O$_3$, comprises an initial shock calcination. Shock calcination is a short-time dehydration conducted in a kiln or other oven, providing average solid particle residence times of less than about 10 seconds in the reaction zone. The shock calcination of finely crystalline hydrargillite particles having a uniform morphological structure (in the form of pseudohexagonal platelets, needles or with a polyhedral external shape) is conducted at temperatures ranging from about 350° C. to 700° C.

The uniform morphological structure of the starting material is a vital prerequisite for advantageous heat transfer and alumina form conversion during the shock calcination. The shock-like thermal decomposition of the hydrargillite particles takes place at temperatures ranging from about 350° C. to 750° C. during an average residence time of from about 0.01 to 10 seconds.

Particularly suitable for use in the present invention are hydrargillite particles in the form of:

a) pseudohexagonal platelets with form factors (i.e., aspect ratio or ratio of diameter to thickness) of >5, a platelet diameter of 0.1 to 50 μm and a thickness of 0.1 to 5 μm, which are treated at temperatures from about 350° C. to 550° C. during average residence times of from about 0.05 to 1.0 seconds;

b) pseudohexagonal needles with form factors (ratio of length to diameter) of >5, a length of 0.1 to 50 μm with a diameter of 0.1 to 5 μm, which are treated at temperatures of 370° C. to 600° C. and average residence times of 0.1 to 1.5 seconds;

c) equiaxial aggregates of polyhedral particles with a form factor (ratio of diameter to thickness) of <5, and a particle diameter, as a $D^{50}$ value, of between 0.5 and 5 μm, which are treated at temperatures of from about 400° C. to 630° C. and average residence times of from about 0.5 to 5 second.

As a result of their high structural lattice disorder, which is expressed, for example, in the particularly high content of 5-fold coordinated aluminum, the partially crystalline, transitional aluminum oxides obtained in this way have a very high solid state reactivity, which is necessary for an extensive rehydration of such solids into fibrillar boehmite under the conditions described below.

The shock calcination products, including partially crystalline, transitional aluminum oxides, may be rehydrated in an aqueous suspension (ratio by weight of solid to liquid of 1:3 to 1:10) under either discontinuous or continuous conditions at temperatures of from about 50° C. to 95° C. at a pH of from about 5.5 to 10.5 during a period of from about 45 to 120 minutes. The boehmite-rich rehydration products have a pronounced fibrillar morphology, which is responsible, on the one hand, for the need for adjusting the viscosity of the mixtures of these materials with the appropriate inorganic/organic acids during the peptization step and, on the other, for selective control of the textural properties (pore structure) and mechanical properties (strength) of the molded articles obtained in this way, which consist primarily of gamma $Al_2O_3$. Under the above-recited rehydration conditions, the rehydration product is preferably at least 75% by weight fibrillar boehmite.

On the basis of the hydrargillitic raw materials described, it is possible, after rehydration and leaching (e.g., filtering and washing with water) (see table 2), to obtain boehmite-rich products with a $Na_2O$ content of <0.03% by weight (based on the $Al_2O_3$).

These alkali-deficient, boehmite-rich rehydration products are subsequently, either as filter cake (moist) or in the form of dried and de-agglomerated (for example, in a pinned disk mill) solid particles, mixed with peptizing agents or binders or lubricants and processed further to molded articles. Extruding, granulating, the drop method and pelletizing may be used in the molding process.

The boehmite-rich rehydration product should preferably be mixed with peptizing agents, binders or lubricants as appropriate for the particular molding method employed.

If the rehydration product is to be extruded, it may be mixed and peptized with an acid in a molar ratio of acid to $Al_2O_3$ of between about 0.005 and 0.05 at about 25° C. within about 15 to 90 minutes. If the rehydration product is to be molded by granulation or the drop method, a more intensive peptization is carried out at a molar ratio of acid to $Al_2O_3$ of between about 0.02 and 0.2 at about 25° C. within about 30 to 120 minutes. When boehmite-rich rehydration product, which has not been dried (moist filter cake) is used in either the granulation or drop method, the molar ratio of acid to $Al_2O_3$ is to be adjusted to a value between about 0.025 and 0.15, while the peptization time remains the same.

After an appropriate molding and a thermal post-treatment (discussed below), molded articles are obtained, which consist essentially of gamma $Al_2O_3$, the maxima of the pore radii distribution being displaced in the direction of larger pore radii. As a result, such formed $Al_2O_3$ bodies find wider application with respect to obtaining catalyst components and catalyst supports.

If dried and de-agglomerated rehydration products are to be pelletized, they must first be mixed with a lubricant or binder (such as graphite).

The thermal post-treatment of the formed bodies, which have been prepared in different ways, is carried out at temperatures ranging from about 450° C. to 650° C. within about 4 to 8 hours. The extrudates and drop spheres should preferably be dried for about 12 to 24 hours at temperatures of about 100° C. to 150° C., before the thermal post-treatment.

The present molded articles, which include essentially gamma $Al_2O_3$, have a large internal surface area, as well as a high mechanical strength. They are suitable, in particular, for the production of adsorbents, gas purifying compositions, catalyst components and catalyst supports, as well as for the manufacture of ceramic materials, polishing agents and abrasive grit.

The invention is explained in greater detail in the following examples.

COMPARATIVE EXAMPLE 1

Figure 2:
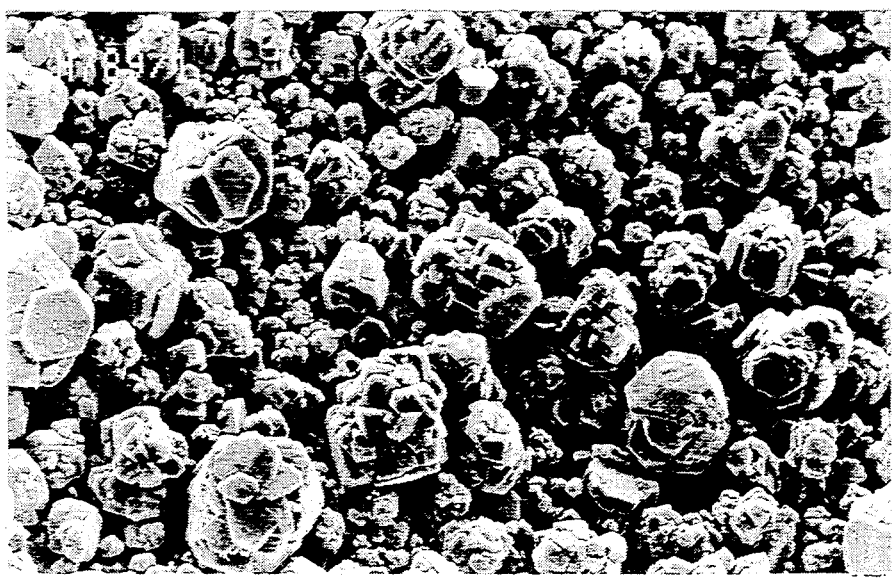
FIG. 2 shows an SEM photograph of the starting hydrargillite Hy-F of Table 1 (Hy-G has an analogous morphology).

Hydrargillite (Hy) was pre-treated mechanically in a vibrating ball mill, until 50% had a particle size in the range of 20 to 60 μm (Hy-F) and 2.5 to 18.5 μm (Hy-G). The hydrargillite had a residue on ignition at 1100° C. of 65.1% by weight, a specific surface area of less than 2 $m^2/g$ and a solubility of particles in NaOH (within 30 minutes at 60° C., determined by means of a 5N NaOH solution) of 25.4% by weight of solids based on the $Al_2O_3$, as well as a morphological heterogeneous nature (according to samples Hy-F and Hy-G in Table 1 and FIG. 2). The hydrargillite was thermally decomposed for a short time in a reaction space at temperatures of 500° C. with a delta T of 40° K. and an average residence time of the particles in the reaction zone of 0.5 seconds. A partially crystalline calcination product with a heterogeneous phase composition, a specific surface area of >250 $m^2/g$ and a corresponding reactivity was obtained (according to Table and FIG. 5, samples Hy-F/KC and Hy-G/KC).

The shock calcination products, consisting mainly of a partially crystalline mixture of chi and gamma $Al_2O_3$, were rehydrated in a ratio by weight of solid to liquid of 1:4.5 at a temperature of 90° C. over a period of 80 minutes at a pH of 8. The rehydration product was subsequently filtered, washed, dried for 12 hours at 120° C. and deagglomerated by means of a pinned disk mill.

The solid material, containing up to 30% by weight of fibrillar boehmite, had a residual $Na_2O$ content of 0.04% by weight (based on the $Al_2O_3$). It was processed further by known methods to molded articles: pills (5×5 mm), sphere (1.5–6 mm diameter) and extrudates (strands of 1.2 mm to 6.0 mm diameter). Some characteristic properties of selected, molded $Al_2O_3$ articles, which were obtained after calcining for 12 hours at 500° C., are compared in Table 3.

EXAMPLE 2

Figure 1:
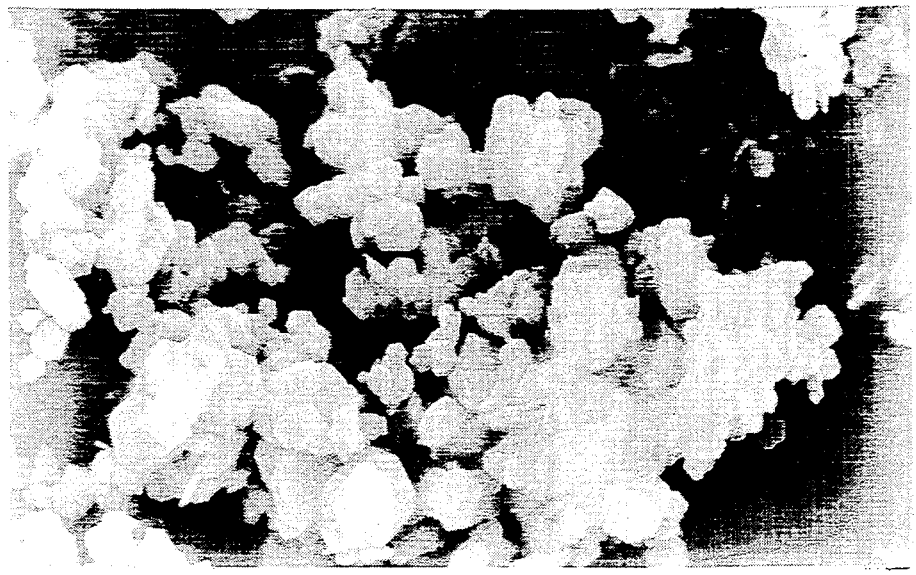
FIG. 1 shows a scanning electron microscope ("SEM"). photograph of the starting hydrargillite Hy-C of Table 1 (Hy-D and Hy-E have a similar polyhedral morphology).

Pursuant to the present invention, hydrargillite particles (Hy-C, Hy-D and Hy-E, see Table 1 and FIG. 1), with a uniform, external, polyhedral shape or a form factor of <5, but different average particle diameter ranges (50% of the particle portion having a maximum deviation with respect to the average particle size of 1 μm in sample Hy-C, of 0.5 μm in. sample Hy-D and of 0.6 μm sample Hy-E), were heated in shock fashion at temperatures of 480° C. with a delta T of 40° K. at average residence times of the solid particles in the reaction zone of a shock calcination kiln of 0.5 seconds.

Figure 6:
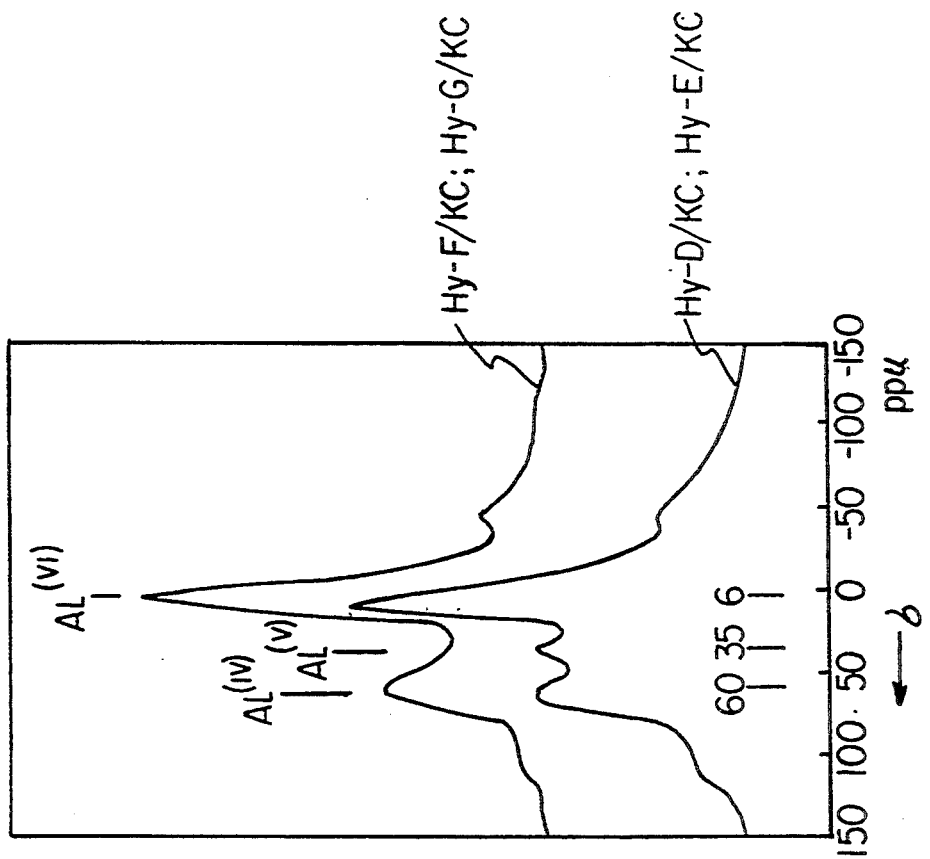
FIG. 6 shows $^{27}$Al-MAS NMR spectra of the shock calcination products. (Examples of the invention Hy-D/KC and Hy-E/KC, Hy-A/KC, Hy-B/KC and Hy-C/KC having similar spectra. Comparison examples: Hy-F/KC and Hy-G/KC).
Figure 3A:
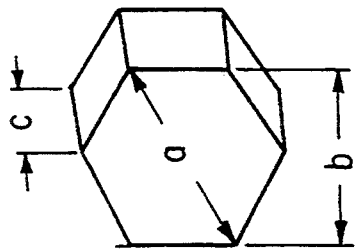
Figure 4A:
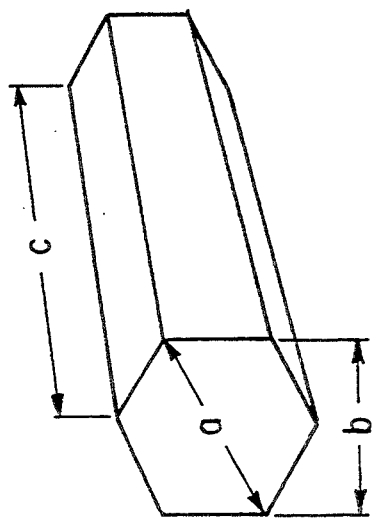

The most important physical and chemical properties of the resulting, highly reactive solids are given in Table 2 (Hy-C/KC, Hy-D/KC and Hy-E/KC), as well as in FIGS. 5 and 6.

The boehmite-rich intermediate, filtered and washed after the rehydration (as in Example 1), was dried within 12 hours at 120° C. and subsequently deagglomerated in a pinned disk mill. The fibrillar boehmite was mixed with different amounts of a binder or lubricant or a peptizing agent, depending on the molding process used.

For the production of spherical molded articles, the fibrillar boehmite was suspended in water with the addition of nitric acid (molar of $HNO_3$: $Al_2O_3$ of 0.07) for 1 hour and the mixture subsequently converted into the desired formed bodies by means of fluidized bed granulation equipment or by a drop sphere process comprising dropping the mixture through a column filled with ammonia water which is overlaid by a hydrocarbon layer. The formed bodies were calcined for 5 hours at 500° C., the gelatinous molded objects, leaving the drop sphere equipment, previously being dried for 12 hours at 120° C. The resulting solid properties of the molded articles, which contain essentially gamma $Al_2O_3$ (at least about 75% by weight), are summarized in Table 3.

For the extrusion of the shock-calcined fibrillar boehmite, which was obtained from Hy-D and subsequently rehydrated, appropriately dried and deagglomerated, the boehmite was peptized in a kneader (a double shaft extruder) for 30 minutes with addition of water and nitric acid. The highly viscous composition so obtained was molded with an extruder to form vortex strands (diameter: 1.2 to 6.0 mm), molded, dried and calcined. The resulting solid properties of the extruded vortex strands are also listed in Table 3.

EXAMPLE 3

Figure 3:
FIG. 3 shows an SEM photograph of the platelet type starting hydrargillite Hy-A.

Pursuant to the invention, hydrargillite particles, which had not been milled and had uniform morphological properties, in the form of pseudohexagonal platelets (in accordance with sample Hy-A in Table 1 and FIG. 3), were subjected within an average residence time of the solid particles of 0.5 seconds to a continuous, thermal treatment at a temperature of 420° C. with a delta T of 40° K. resulting in partially crystalline chi $Al_2O_3$-like solids with special structure characteristics (as shown in Table 2 for the Hy-A/KC sample), especially in terms of its high rehydration reactivity.

A rehydration of such partially crystalline transitional aluminum oxides, carried out under the same conditions as in Example 1, after molding, resulted in a solid material with 74% by weight of boehmite (compare Table 2) and an $Na_2O$ content of 0.018% by weight (based on $Al_2O_3$). The corresponding molded articles, which contain essentially gamma $Al_2O_3$ (at least about 75% by weight), are produced as in Example 2.

EXAMPLE 4

Figure 4:
FIG. 4 shows an SEM photograph of the needle-shaped, prismatic starting hydrargillite Hy-B.

Pursuant to the present invention, a hydrargillitic starting material (Hy-B, see Table 1 and FIG. 4) having a uniform external shape in the form of hexagonal needles/prisms, was subjected to a shock-type calcination in a continuous process at a temperature of 450° C. (delta T=40° K.) within 0.5 seconds. The decomposition products, obtained in this manner, are distinguished by the solid properties shown in Table 2 (Hy-B/KC).

A boehmite-rich solid material of fibrillar morphology (81% by weight of boehmite), with a residual $Na_2O$ content of 0.016% by weight (based on $Al_2O_3$), was formed by a subsequent rehydration under the conditions listed in Example 1. The corresponding molded articles, which consists essentially of gamma $Al_2O_3$, are produced as in Example 2.

TABLE 1

Physical and Chemical Properties of the Original Hydrargillite

| Characteristic Quantity | Hydrargillite Sample | | | | | | |
|---|---|---|---|---|---|---|---|
| | A | B | C | D | E | F | G (not of the invention) |
| Chemical Composition | See Example "Hy-A" | | | | | See Example "Hy-F" | |
| Residue on Ignition (1100° C.) in % by weight | 65 | | | | | 65.1 | |
| ×$Na_2O$ in % by weight | ≦0.20 | | | | | ≦0.45 | |
| ×$Fe_2O_3$ in % by weight | 0.035 | | | | | 0.08–0.10 | |
| ×$SiO_2$ in % by weight | 0.20 | | | | | 0.35 | |
| Phase Composition by XRD | Very well Crystallized Hydrargillite | | | | | | |
| Morphological Properties | Pseudo hexagonal platelets (see FIG. 3) | Pseudo hexagonal prism/needles (see FIG. 4) | Polyhedra (see FIG. 1) | | | Agglomerates (spherical, laminar and prismatic) (see FIG. 2) | |
| Specific Surface Area in m²/g | 5–8 | 3–5 | 5–8 | 10–12 | <1 | 1.5 | |
| Particle Size Fraction (50%) in μm | 1.5–2.0 | 1.5–2.5 | 1.5–2.0 | 1.2–1.8 | 20–60 | 2.5–18.5 | |

TABLE 2

Solid Properties of Partially Crystalline Aluminum Oxides of the Shock Calcination of Hydrargillite and its Derivatives

| Characteristic Quantity | Calcinated and Rehydrated Products | | | | | | |
|---|---|---|---|---|---|---|---|
| | A | B | C | D | E | F | G |
| Residue on Ignition (1100° C.) | 92.5 | 93.0 | 94.0 | 93.0 | 91.6 | 92.0 | 93.0 |

TABLE 2-continued

Solid Properties of Partially Crystalline Aluminum Oxides of the Shock Calcination of Hydrargillite and its Derivatives

| Characteristic Quantity | Calcinated and Rehydrated Products | | | | | | |
|---|---|---|---|---|---|---|---|
| | A | B | C | D | E | F | G |
| in % by weight Phase Composition | Partially crystalline chi Al$_2$O$_3$ with XRD amorphous portions with missing interference at $d_{hkl} = 0.211$ nm (See FIG. 5, Hy-D/KC and Hy-E/KC) | | | | | Partially crystalline chi/gamma-Al$_2$O$_3$ with small proportions of hydrargillite (See FIG. 5, Hy-F/KC and Hy-G/KC) | |
| Specific Surface Area in m$^2$/g | 64 | 52 | 230 | 285 | 306 | 275 | 254 |
| Solid Reactivity | | | | | | | |
| a) solubility (L) in NaOH in % by weight | 95 | 100 | 96 | 100 | 100 | 59 | 72 |
| b) Rehydration Reactivity (ability to form aluminum hydroxide/ boehmite in a neutral medium Boehmite contents in % by weight | 74 | 81 | 76 | 81 | 85 | 22 | 28 |

TABLE 3

Solid Properties of Al$_2$O$_3$ Molded Articles

| | | Al$_2$O$_3$ Molded Articles | | | | |
|---|---|---|---|---|---|---|
| | | Comparison Example (not of the invention) Hy-F/KC/RH/PE/FO . . . | | Examples of the Invention Hy-D/KC/RH/DE/FO . . . | | |
| Characteristic Quantity | | Spheres (1.5–6 mm) | Extrudate (1.2–6 mm strands) | Spheres (1.5–6 mm) | | Extrudate (1.2–6 mm strands) |
| | | K | WG | | K | WG |
| Abrasion Resistance | | chi/gamma Al$_2$O$_3$ | | | essentially gamma Al$_2$O$_3$ | |
| d$_{bulk}$ | in kg/L | 0.78 | 0.65 | 0.69 | 0.62 | 0.54 | 0.58 |
| V$_{p\ total}$ | in cm$^3$/g | 0.50 | 0.58 | 0.48 | 0.63 | 0.70 | 0.56 |
| S$_{BET}$ | in m$^2$/g | 172 | 196 | 185 | 211 | 220 | 228 |
| Abrasion[1)] | in Ma.-% | | 20 | | | 3 | |
| Abrasion Resistance | in Ma.-% | | 80 | | | 97 | |

[1)]By air-lift method

Abbrevation Key
Hy = hydrargillite
F, D = original hydrargillite sample (see Table 1)
KC = shock calcination
RH = rehydration
PE = peptization
FO = molding
K = spherical, gamma Al$_2$O$_3$ (by drop method)
WG = spherical gamma Al$_2$O$_3$ by means of fluidized bed granulation
S$_{BET}$ = specific surface area
V$_{p\ total}$ = total pore volume
d$_{bulk}$ = bulk density

What is claimed is:

1. A process for making highly reactive molded articles of gamma Al$_2$O$_3$, the process comprising the steps of:
   a) subjecting finely crystalline hydrargillite particles having a uniform morphological structure to a shock calcination process comprising passing the hydrargillite particles through a reaction zone, the zone having a temperature between 350° and 750° C. for a period of time such that the average residence time of said particles in the reaction zone is between 0.05 and 10.0 seconds and obtaining a partially crystalline, transitional aluminum oxide composition comprising 4-fold coordinated aluminum oxide and 5-fold coordinate aluminum oxide wherein the ratio of 5-fold coordinated aluminum oxide to 4-fold coordinated aluminum oxide is at least 1:2 by weight;
   b) rehydrating the partially crystalline, transitional aluminum oxide composition to obtain predominantly fibrillar boehmite;
   c) filtering and washing with water the rehydration product to remove alkali metal ions;
   d) mixing the rehydration product with a compound selected from the group consisting of peptizing agents, binders and lubricants, and mixtures thereof:
   e) molding the mixture into a molded article; and
   f) thermally treating the molded article to convert the alumina therein to essentially active, gamma Al$_2$O$_3$.

2. The process for making highly reactive molded articles of claim 1, wherein the hydrargillite particles have pseudohexagonal platelet morphology, form factors >5, diameters between 0.1 to 50 μm and thicknesses between 0.1 to 5 μm.

3. The process for making highly reactive molded articles of claim 2, wherein in the subjecting step the reaction zone has a temperature between 350° to 550° C. and the average residence time is between 0.05 and 1.0 seconds.

4. The process for making highly reactive molded articles of claim 1, wherein the hydrargillite particles used in the subjecting step have pseudohexagonal needle morphology, form factors >5, diameters between 0.1 to 50 μm and thicknesses between 0.1 to 5 μm.

5. The process for making highly reactive molded articles of claim 4, wherein in the subjecting step the reaction zone has a temperature between 370° to 600° C. and the average residence time is between 0.1 and 1.5 seconds.

6. The process for making highly reactive molded articles of claim 1, wherein the hydrargillite particles used to produce composition and have polyhedral morphology, form factors <5 particle diameters expressed as $D^{50}$ values, between 0.5 to 5 μm.

7. The process for making highly reactive molded articles of claim 6, wherein in the subjecting step the reaction zone has a temperature between 400° to 630° C. and the average residence time is between 0.5 and 5.0 seconds.

8. The process for making highly reactive molded articles of claim 1, wherein in the rehydration step the partially crystalline, transitional aluminium oxide is suspended in water at a weight ratio to liquid of between 1:3 and 1:10 and the rehydration is conducted at a pH between 5.5 and 10.5, at a temperature between 50° ad 95° C. and over a period of 45 to 120 minutes.

9. The process for making highly reactive molded articles of claim 8, wherein the rehydration product contains at least 75% by weight fibrillar boehmite.

10. The process for making highly reactive molded articles of claim 1, wherein the filtering and washing step reduces the $Na_2O$ content of the rehydration product to less then 0.03% by weight.

11. The process for making highly reactive molded articles of claim 1, further comprising, after step c), but before step d), deagglomerating the rehydration product.

12. The process for making highly reactive molded articles of claim 1, wherein step d) comprises peptizing by mixing an acid with the rehydration product in a molar ratio to $Al_2O_3$ of between 0.005 and 0.05 and maintaining the mixture for between 15 and 90 minutes at about 25° C., and wherein step e) comprises extruding the mixture to mold an article.

13. The process for making highly reactive molded articles of claim 1, wherein step d) comprises peptizing by mixing an acid with the rehydration product in a molar ratio of acid to $Al_2O_3$ of between 0.02 and 0.2 and maintaining the mixture for between 30 and 120 minutes at about 25° C., and wherein step e) comprises molding by the granulation or drop method.

14. The process for making highly reactive molded articles of claim 4, wherein the deagglomerated rehydration product is mixed with a lubricant or binder prior to step d) and step d) comprises molding by pelletizing.

15. The process for making highly reactive molded articles of claim 14, wherein the binder is graphite.

16. The process for making highly reactive molded articles of claim 1, wherein step f) comprises calcining the molded article to a temperature between 450° and 650° C. for a period of time between 4 and 8 hours and wherein the resultant article consists essentially of active, gamma $Al_2O_3$.

17. The process for making highly reactive molded articles of claim 16, further comprising, prior to the calcining step, drying the molded article at a temperature between 100° and 150° C. for between 12 and 24 hours.

* * * * *

UNITED STATES PATENT AND TRADEMARK OFFICE
CERTIFICATE OF CORRECTION

PATENT NO. : 5,413,985
DATED : May 9, 1995
INVENTOR(S) : Roland Thome et al.

It is certified that error appears in the above-indentified patent and that said Letters Patent is hereby corrected as shown below:

On title page, item [75]

Inventors:", please delete "Rudiger Lange, Lelha; Seigfried Engels," and substitute therefore -- Rudiger Lange, Leiha; Siegfried Engels --.

Signed and Sealed this

Eighth Day of August, 1995

Attest:

BRUCE LEHMAN

Attesting Officer

Commissioner of Patents and Trademarks